(12) United States Patent
Kawase (10) Patent No.: US 7,383,909 B2
(45) Date of Patent: Jun. 10, 2008

(54) VEHICLE BODY FRAME OF MOTORCYCLE

(75) Inventor: Masao Kawase, Shizuoka-ken (JP)

(73) Assignee: Yamaha Motor Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/181,391

(22) Filed: Jul. 14, 2005

(65) Prior Publication Data

US 2006/0037800 A1 Feb. 23, 2006

Related U.S. Application Data

(63) Continuation of application No. PCT/JP2004/000215, filed on Jan. 15, 2004.

(30) Foreign Application Priority Data

Jan. 15, 2003 (JP) .............................. 2003-006645

(51) Int. Cl.
*B62K 11/04* (2006.01)

(52) U.S. Cl. .................................. 180/219; 280/281.1

(58) Field of Classification Search ................ 180/219; 280/781, 785, 274, 278, 287, 281.1
See application file for complete search history.

(56) References Cited

U.S. PATENT DOCUMENTS

| | | | |
|---|---|---|---|
| 4,887,687 A | 12/1989 | Asai et al. | |
| 4,989,665 A * | 2/1991 | Yamagiwa et al. | 164/363 |
| 5,011,172 A * | 4/1991 | Bellanca et al. | 280/281.1 |
| 5,375,677 A * | 12/1994 | Yamagiwa et al. | 180/219 |
| 6,846,018 B2 * | 1/2005 | Dennert et al. | 280/785 |

FOREIGN PATENT DOCUMENTS

| | | |
|---|---|---|
| EP | 0 295 799 A2 | 12/1988 |
| ES | 2 074 018 | 8/1995 |
| IT | 1261106 A | 10/1993 |
| JP | 61-160375 | 7/1986 |
| JP | 63-315384 | 12/1988 |
| JP | 06-144335 | 5/1994 |
| JP | 2001-071975 | 3/2001 |

OTHER PUBLICATIONS

International Search Report; Jul. 27, 2004; 2 pages.

* cited by examiner

*Primary Examiner*—Anne Marie M. Boehler
(74) *Attorney, Agent, or Firm*—Knobbe, Martens, Olson & Bear, LLP (57) ABSTRACT

A motorcycle has a frame assembly in which the main frame is separable into a left side and a right side. Each side of the main frame includes a portion of a steering head pipe and one or more engine mounts. The engine joins rearward portions of the left and right sides of the main frame.

38 Claims, 7 Drawing Sheets

VEHICLE BODY FRAME OF MOTORCYCLE

CROSS-REFERENCE TO RELATED APPLICATIONS

This application is a continuation of PCT Application No. PCT/JP2004/000215, filed Jan. 15, 2004, which claims priority to Japanese Patent Application No. 2003-006645, filed Jan. 15, 2003, both of which are hereby incorporated by reference in their entirety.

BACKGROUND OF THE INVENTION

1. Field of the Invention

The present invention generally relates a vehicle body frame of a motorcycle that can support an engine while reducing the number of parts.

2. Description of the Related Art

Racing motorcycles must possess a high degree of frame rigidity, as do motorcycles styled after such racing motorcycles. Accordingly, there recently has been proposed a split motorcycle body frame. The frame includes a pair of main frames that are split into left and right sides from a steering head pipe. The pair of main frames extend rearwardly and downwardly from that location. A pair of left and right rear arm brackets extend downwardly from rear ends of the respective main frames. The steering head pipe also is split into left and right split steering head pipes. The left and right split steering head pipes, the left and right main frames and the left and right rear arm brackets are integrated into left and right split frames (see, for example, JP-A-63-315384, pages 1-5 and FIG. 3).

In such a split frame construction, the left and right split frames are connected together using a cross member and an engine is suspended on the pair of left and right split frames. Accordingly, the number of parts used during construction is increased due to the need for the cross member. The increase in parts and the associated manufacturing steps results in increased manufacturing costs. Moreover, the increased number of parts results in an increased weight for the frame.

SUMMARY OF THE INVENTION

Accordingly, a frame construction is desired that allows for the benefits associated with the split frame without incurring at least some of the disadvantages associated with such a frame construction.

One aspect of the present invention involves a motorcycle comprising a frame assembly. The frame assembly comprises a left main frame and a right main frame. The left and right main frames each comprise a portion of a steering head pipe. Each of the left and right main frames extends rearward and downward from the portion of the steering head pipe. A left rear arm bracket extends downward from a left main frame and a right rear arm bracket extends downward from the right main frame. The steering head pipe is split into a left portion and a right portion such that the left main frame integrally comprises the left portion of the steering head pipe and the left rear arm bracket and the right main frame integrally comprises the right portion of the steering head pipe and the right rear arm bracket. The left and right portions of the steering head pipe are removably secured together to pivotally support a steering shaft. An engine is directly connected to the left and right main frames.

Another aspect of the present invention involves a motorcycle comprising a body frame. The body frame comprises a left main frame and a right main frame. The left and right main frames are separable at a steering head pipe and extend rearwardly and downwardly from the steering head pipe. A left rear arm bracket and a right rear arm bracket extend downwardly from rear ends of the left and right main frames. The steering head pipe is split into a left steering head pipe portion and a right steering head pipe portion. The left and right steering head pipe portions are removably secured together and together pivotally support a steering shaft. A left split frame is defined by the left steering head pipe portion, the left main frame and the left rear arm bracket combined into a single integrated component. A right split frame is defined by the right steering head pipe portion, the right main frame and the right rear arm bracket combined into a single integrated component. A left engine mounting bracket and a right engine mounting bracket are positioned between the left and right main frames. The left engine mounting bracket is integrally formed with the left split frame and the right engine mounting bracket is integrally formed with the right split frame. An engine is coupled to the left and right engine mounting brackets.

BRIEF DESCRIPTION OF THE DRAWINGS

These and other features, aspects and advantages will now be described with reference to drawings of a preferred embodiment. The drawings comprise the following figures.

DETAILED DESCRIPTION OF THE PREFERRED EMBODIMENT

Figure 1:
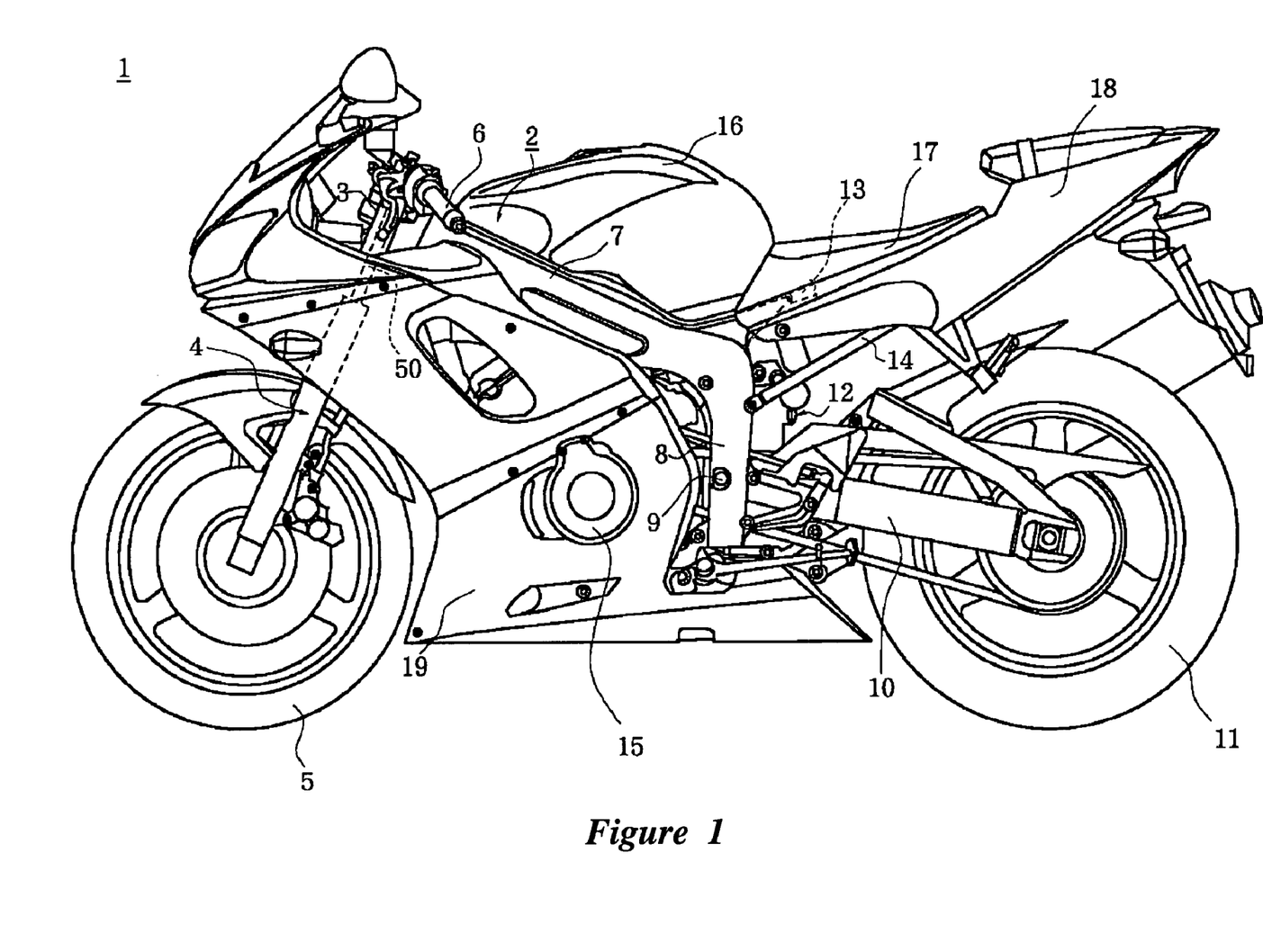
FIG. 1 is a side view of a motorcycle that is arranged and configured in accordance with certain features, aspects and advantages of the present invention.

With reference initially to FIG. 1, a motorcycle 1 is shown that is arranged and configured in accordance with certain features, aspects and advantages of the present invention. The motorcycle 1 comprises a vehicle body frame 2. A front fork 4 is rotatably mounted on a steering head pipe 3 which is provided at a front end of the vehicle body frame 2. A front wheel 5 is mounted on a lower portion of the front fork 4. A steering shaft 50 extends upward from the front fork 4. A steering handle 6 is mounted on the steering shaft 50.

As will be described in greater detail below, the main frame is separable into a left side and a right side thereby fonning a pair of main frames 7. The main frames 7 are split from the steering head pipe 3 and, from the head pipe 3, the frames 7 extend rearward and downward. A left rear arm bracket and a right rear arm bracket, collectively indicated by reference numeral 8, extend downward from the rear end of the corresponding main frame 7. A pivot shaft 9 pivotally supports a forward end of a rear arm 10 generally between the rear arm brackets 8. A rear wheel 11 is mounted on a rear portion of the rear arm 10. Rear shock absorbers 12 support the rear wheel 11 relative to the main frames 7.

Seat rails 13 are mounted on the pair of left and right main frames. As illustrated, stays 14 are mounted on the rear arm brackets 8 and extend to the seat rails 13. The stays 14 lend added strength and rigidity to the seat rails 13.

An engine 15 is suspended from the main frames 7 and the rear arm brackets 8. A fuel tank 16 is mounted on the main frames 7 above the engine 15. A seat 17 is mounted on the seat rails 13 behind the fuel tank 16. Portions of the motorcycle 1 disposed to both sides of the seat 17 are covered with a rear cowl 18. In addition, portions of the motorcycle 1 disposed to both sides of the vehicle body and above the engine 15 as well as a portion of the motorcycle 1 extending from below the fuel tank 16 to the front side of the steering head pipe 3 preferably are covered with a front cowl 19.

Figure 2:
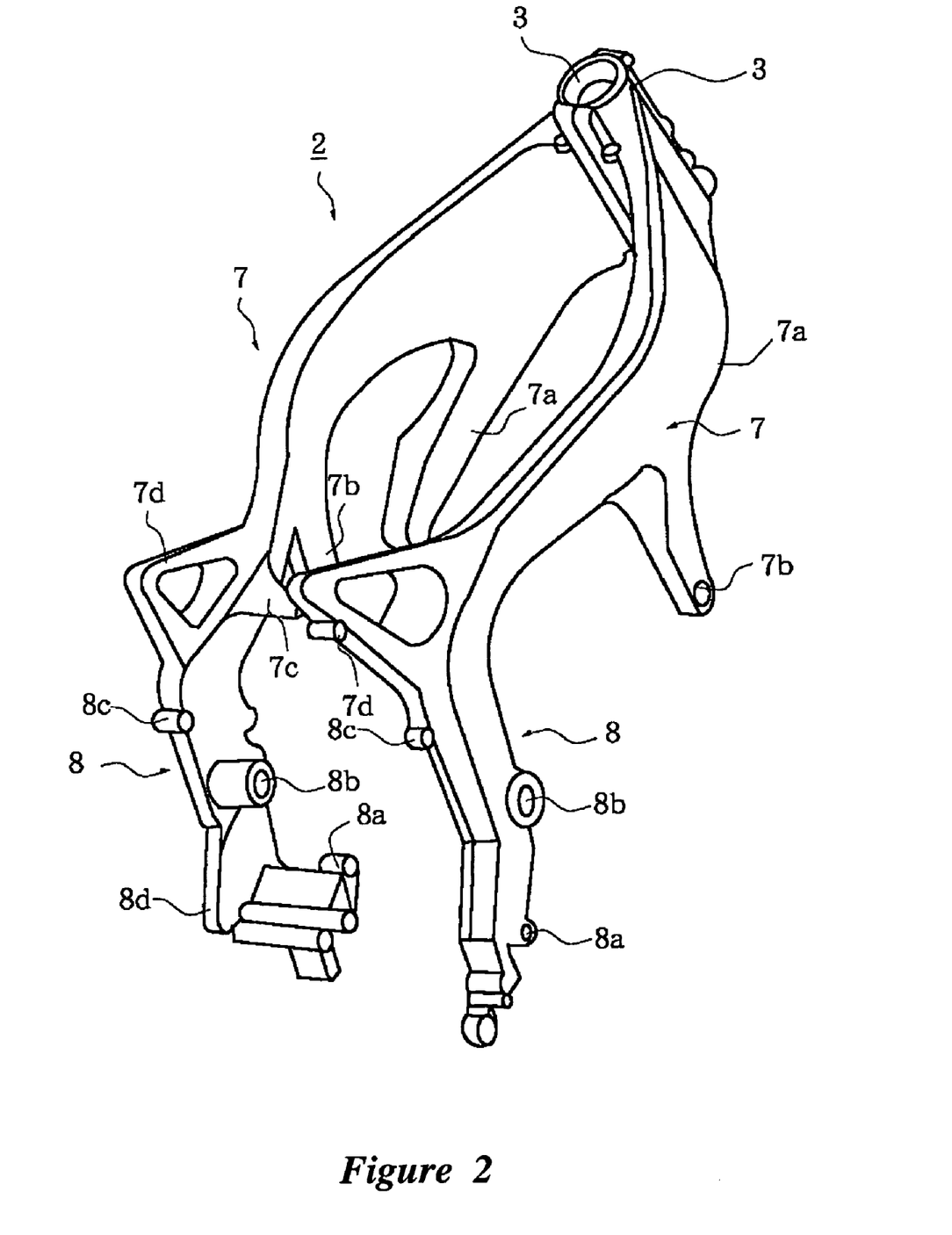
FIG. 2 is a perspective view of a vehicle body frame used on the motorcycle of FIG. 1.

With reference now to FIG. 2, the frame advantageously is configured such that the steering head pipe 3 is separable into left and right split steering head pipes 3. In a preferred configuration, the left and right split steering head pipes 3, the left and right main frames 7 and the left and right rear arm brackets 8 are integrally formed, such as by diecast forming, into separate left and right split frames. The split frames can be joined in any manner such that the frames, when coupled, define the frame 2.

A left engine mounting bracket 7a extends downward from the left main frame 7. The left engine mounting bracket 7a preferably is integrally formed with the left main frame 7. Moreover, the left engine mounting bracket 7a preferably extends downward from a central portion of the main frame 7.

A right engine mounting bracket 7b extends downward from the right main frame 7. The right engine mounting bracket 7b preferably is integrally formed with the right main frame 7. The right engine mounting bracket 7b preferably extends downward from a central portion of the main frame 7.

Figure 4:
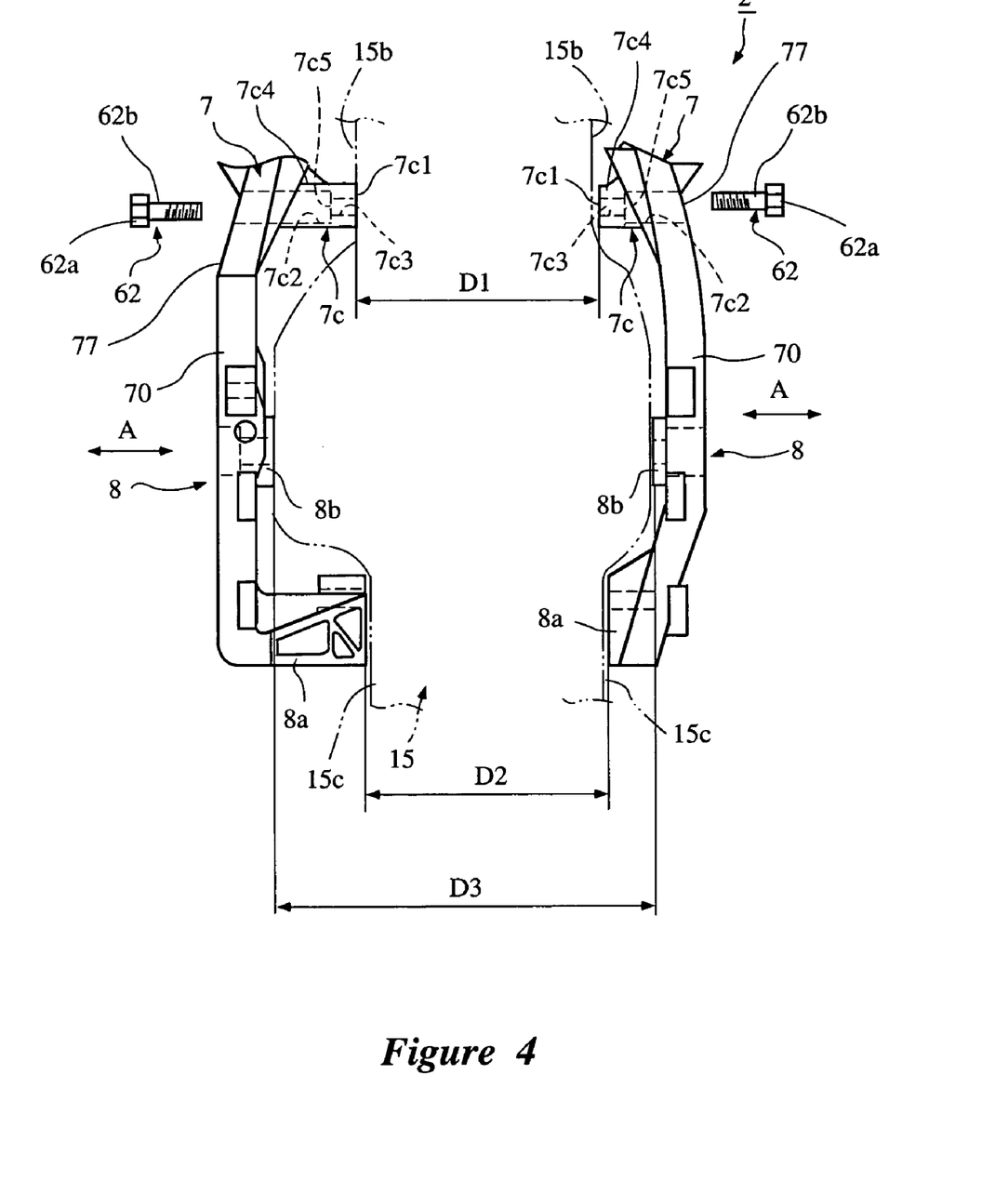
FIG. 4 is a rear view of a portion of the vehicle body frame of FIG. 2.

With reference to FIG. 4, an engine mounting bracket 7c is positioned on a rearward portion of each of the left and right main frames 7. In the illustrated arrangement, the engine mounting bucket 7c is integrally formed with the main frames 7 and extends inwardly. With reference again to FIG. 2, a seat rail mounting bracket 7d projects upwardly from each of the main frames 7.

An engine mounting bracket 8a extends inwardly from the lower front side portion of the rear arm bracket 8. Preferably, the engine mounting bracket 8a is integrally formed with the rear arm bracket 8. A pivot bearing portion 8b extends inwardly from a center portion of the rear arm bracket 8. Preferably, the pivot bearing portion 8b is integrally formed with the rear arm bracket 8. On an upper rear side portion of the rear arm bracket 8, a stay mounting portion 8c preferably is integrally formed on an upper rear side portion of the rear arm bracket 8 and a footrest mounting portion 8d is integrally formed on a lower rear-side portion of the rear arm bracket 8.

The engine 15 is arranged between the pair of left and right main frames 7 and the rear arm bracket 8. A front portion of a cylinder 15a and a rear portion of the cylinder 15a are secured to the two engine mounting brackets 7a in any suitable manner. In the illustrated arrangement, the engine mounting brackets 7a and the cylinder 15a are secured using fastening bolts 60, 61 or any other suitable type of mechanical fastener or interlocking configuration. An upper mounting support portion 15b of the engine 15 is secured to the engine mounting bracket 7c in any suitable manner. In the illustrated arrangement, fastening bolts 62 are used to secure the upper mounting support portion 15b of the engine 15 and the engine mounting brackets 7c. A lower mounting support portion 15c of the engine 15 preferably is secured to the engine mounting bracket 8a in any suitable manner. In the illustrated arrangement, a fastening bolt 63 secures the lower mounting support portion 15c and the engine mounting bracket 8a together.

Figure 3:
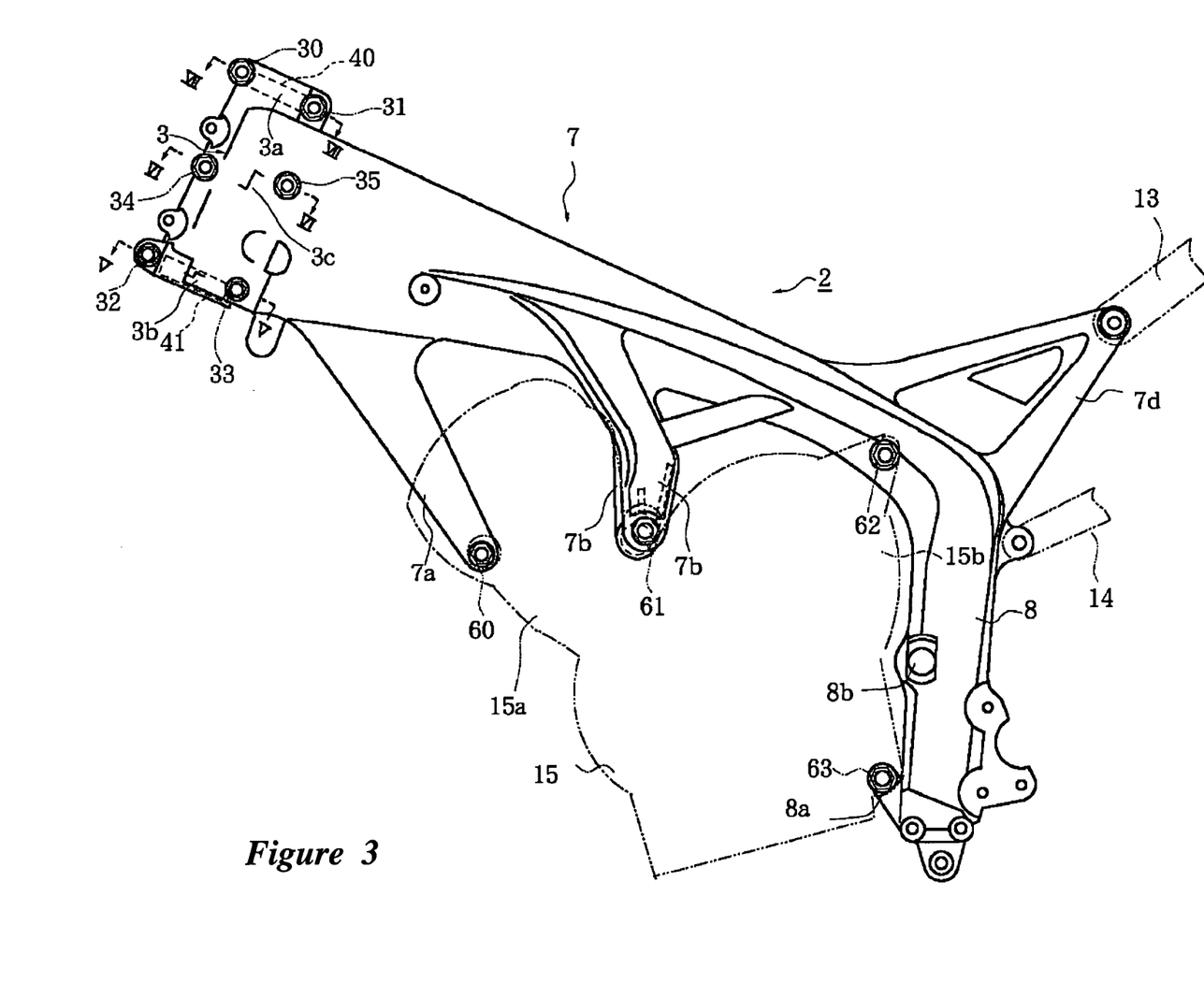
FIG. 3 is a side view of the vehicle body frame of FIG. 2.

With reference now to FIGS. 3 and 4, the engine mounting brackets 7c comprise a contact portion 7c1 which is brought adjacent to, or into contact with, the upper mounting support portion 15b of the engine 15. The engine mounting brackets 7c also comprise a head insertion hole portion 7c2 through which a head portion 62a of the fastening bolt 62 can be inserted and a shaft insertion hole portion 7c3 through which a shaft portion 62b of the fastening bolt 62 can be inserted. As illustrated, the engine mounting brackets 7c further comprise an outer cylindrical portion 7c4, which have larger diameters than a diameter of the head insertion hole portion 7c2 and which have an approximately concentric shape with respect to the head insertion hole portion 7c2. A seat surface 7c5 is defined as a step between the head insertion hole portion 7c2 and the shaft insertion hole portion 7c3. The seat surface 7c5 is positioned inside an outside surface 77 of the main frame 7 and provides a surface on which the head 62a of the fastening bolt 62 can be seated.

The engine mounting brackets 7c and the engine mounting brackets 8a preferably project inwardly. In a preferred configuration, a width D1 between the engine mounting brackets 7c is approximately equal to a width D2 between the engine mounting brackets 8a and is narrower than a width D3 between the pivot bearing portions 8b and hence, the shapes of the engine mounting brackets 7c and the engine mounting brackets 8a generally conform to shapes of the upper mounting support portion 15b and the lower mounting support portion 15c of the engine 15.

The mold removing direction of the main frame 7 at the time of performing the diecasting molding is the direction indicated by an arrow A in FIG. 4. Due to this mold removal during diecast molding, the engine mounting bracket 7c, the engine mounting bracket 8a and the pivot bearing portion 8b are integrally formed and preferably include suitable draft angles.

By bringing the contact portion 7c1 of the engine mounting bracket 7c into contact with the upper mounting support portion 15b of the engine 15, inserting the fastening bolt 62 into the head insertion hole portion 7c2 and the shaft insertion hole portion 7c3 from the outside and tightening the fastening bolt 62 into the upper mounting support portion 15b, the head portion 62b of the fastening bolt 62 is seated on the seating surface 7c5. Due to such a constitution, the engine mounting bracket 7c and the engine 15 are secured together while also resulting in the direct suspension of the engine 15.

With reference to FIG. 3, the engine mounting bracket 7c preferably is formed within a width W1 of the main frame 7. The main frame 7 and the engine mounting bracket 7c are positioned such that the structure has significant rigidity. Therefore, it is unnecessary to make the engine mounting bracket 7c particularly large because the engine mounting bracket 7c and the main frame 7 together possess sufficient rigidity. Accordingly, it is possible to suspend the engine from the main frame 7 while reducing the size and the weight of the body frame.

Further, the engine mounting bracket 7c is formed in the vicinity of a bent portion 70 defined between the main frame 7 and the rear arm bracket 8. Although a load is concentrated on the bent portion 70, by forming the engine mounting bracket 7c on the bent portion 70, the strength and rigidity of the bent portion 70 on which the load is concentrated is increased.

With reference to FIGS. 2 and 3, the seat rail mounting bracket 7d, which supports the seat rail 13, is formed on the rearward portion of the main frame 7 and the engine mounting bracket 7c is formed in the vicinity of a connection portion 71 provided between the main frame 7 and the seat rail mounting bracket 7d. Although a load is concentrated on the connection portion 71 between the main frame 7 and the seat rail mounting bracket 7d, by positioning the engine mounting bracket 7c on the connection portion 71, the strength and rigidity of the connection portion 71 to which the load is concentrated is increased.

Furthermore, the seat rail mounting bracket 7d has a plate-like shape and includes a proximal portion 7d1 which is connected to the connection portion 71. The proximal portion has a large width in the longitudinal direction of the main frame 7. The seat rail mounting bracket 7d also has a support portion 7d2 which extends from the proximal portion 7d1 and supports the seat rail 13. The engine mounting bracket 7c is arranged within a width W2 of the proximal portion 7d1. Because of the configuration of the seat rail mounting bracket 7d, it is possible to increase the strength and rigidity of the seat rail mounting bracket 7d on which the load is concentrated and hence, without providing a particular reinforcement, it is possible to support the seat rail 13 at a low cost. Further, the engine mounting bracket 7c is arranged in a connection portion 71 within a width W2 of the base portion 7d1 of the seat rail mounting bracket 7d, and hence, the rigidity of the connection portion 71 can be increased due to the connection between the engine mounting bracket 7c and the engine 15.

Thus, the engine 15 connects the two sides of the split frames 7. The engine is suspended between the main frames 7 and the rear arm brackets 8 Thus, the engine can be suspended while reducing the number of parts by the elimination of a cross member and the like. Accordingly, the cost and weight of the motorcycle 1 can be reduced. Further, by securing the engine 15 to the engine mounting brackets 7a, 7b, 7c, 8a, which are integrally formed on the left and right split frames, it is possible to easily and surely mount the engine without providing separate mounting members. Thus, the number of separate components can be further reduced.

Figure 5:
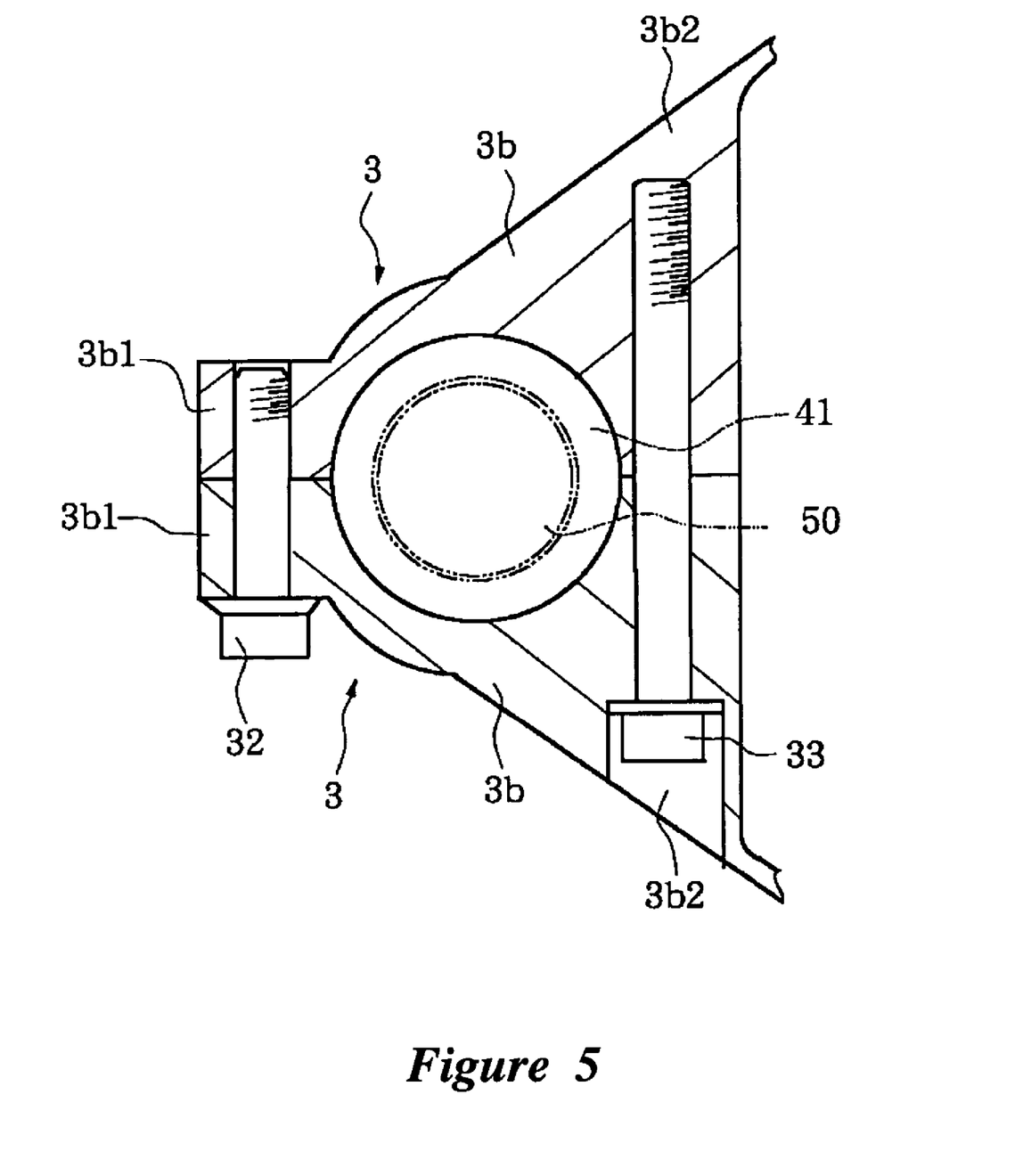
FIG. 5 is a cross-sectional view taken along a line V-V in FIG. 3.
Figure 6:
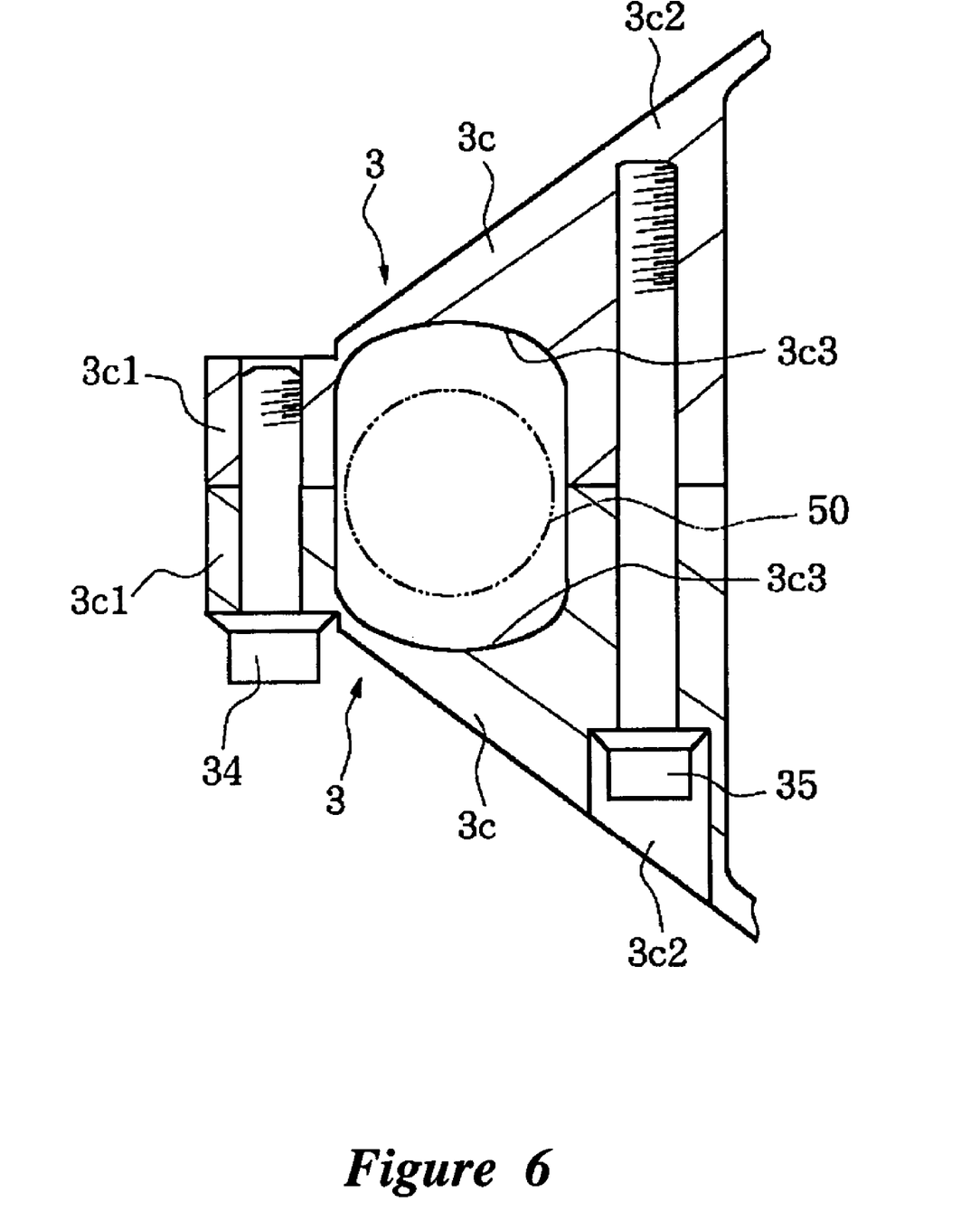
FIG. 6 is a cross-sectional view taken along a line VI-VI in FIG. 3.
Figure 7:
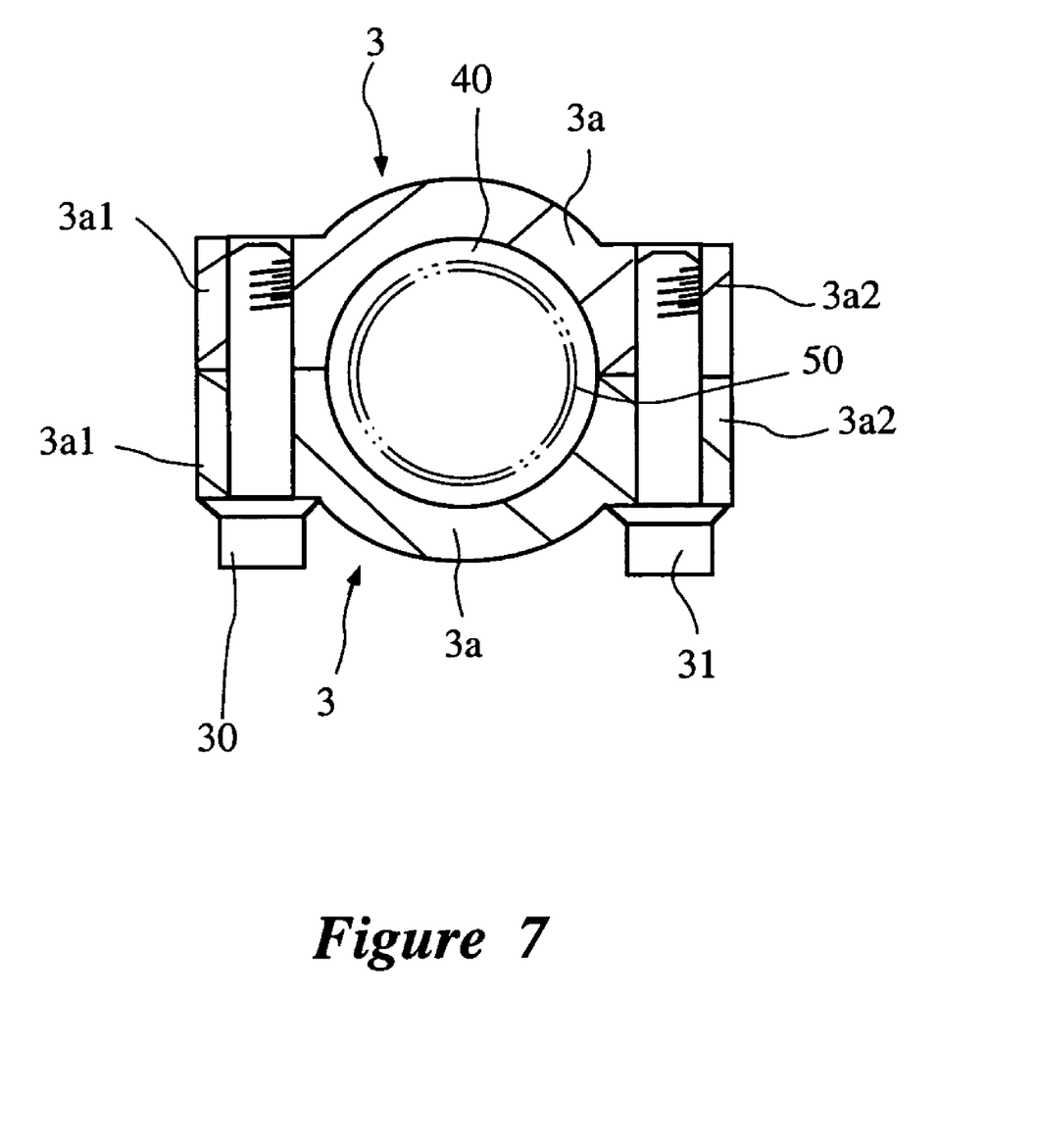
FIG. 7 is a cross-sectional view taken along a line VII-VII in FIG. 3.

With reference now to FIGS. 5-7, the steering head pipe 3 comprises an upper bearing portion 3a and a lower bearing portion 3b, and further comprises an intermediate fastening portion 3c between the upper bearing portion 3a and the lower bearing portion 3b. In the illustrated configuration, the upper bearing portion 3a projects further upwardly than an upper portion of the main frame 7, which allows a forward portion 3a1 and a rearward portion 3a2 of the upper bearing portion 3a to have approximately the same width. The forward portion 3a1 and the rearward portion 3a2 are secured together in any suitable manner. In the illustrated configuration, the portions are secured together using a forward bolt 30 and a rearward bolt 31. In one preferred configuration, the forward bolt 30 and the rearward bolt 31 have the same length.

The lower bearing portion 3b allows a rearward portion 3b2 to have a width wider than a width of a forward portion 3b1. The forward portion and the rearward portion can be secured together in any suitable manner. In the illustrated arrangement, the lower bearing portion 3b is secured together using a forward bolt 32 and a rearward bolt 33. In one preferred configuration, the rearward bolt 33 is longer than the forward bolt 32.

With reference now to FIG. 6, a rearward portion 3c2 of the intermediate fastening portion 3c has a greater width than a forward portion 3c1. Preferably, the intermediate fastening portion 3c is secured together in any suitable manner. In the illustrated arrangement, the intermediate fastening portion 3c is secured with a forward bolt 34 and a rearward bolt 35. Preferably, the rearward bolt 35 is longer than the forward bolt 34.

A steering shaft 50 is pivotally supported on the upper bearing portion 3a and the lower bearing portion 3b by way of bearings 40, 41. A thin-wall recessed portion 3c3 is formed in the intermediate fastening portion 3c to further increase weight reduction.

The upper bearing portion 3a allows the forward bolt 30 and the rearward bolt 31 to have the same length at the forward portion 3a1 and the rearward portion 3a2. Hence, the fastening bolts 30, 31 are unlikely to obstruct the placement of instrument wires and the like around the steering handle 6. Further, the lower bearing portion 3b allows the rearward portion 3b2 to have a larger width than the forward portion 3b1 and allows the rearward bolt 33 to be longer than the forward bolt 32. Still further, the intermediate fastening portion 3c allows the rearward portion 3c2 to have a larger width than the forward portion 3c1 and allows the rearward bolt 35 to be longer than the forward bolt 34. Accordingly, the structural integrity of the steering head pipe 3 is increased and, while temporarily secured together during engine mounting, the steering head pipe connection has sufficient strength to facilitate engine mounting. Moreover, the bonding rigidity of the split frames is further enhanced by the illustrated construction.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A motorcycle comprising a frame assembly, said frame assembly comprising a left main frame and a right main frame, an engine mounting bracket being integrally formed on each of said left and right main frames, an engine being directly connected to said left and right main frames by said engine mounting brackets, said left and right main frames each comprising a portion of a steering head pipe, each of said left and right main frames extending rearward and downward from said portion of said steering head pipe, a left rear arm bracket extending downward from a left main frame and a right rear arm bracket extending downward from said right main frame, said steering head pipe being split into a left portion and a right portion such that said left main frame integrally comprises said left portion of said steering head pipe and said left rear arm bracket and said right main frame integrally comprises said right portion of said steering head pipe and said right rear arm bracket, said left and right portions of said steering head pipe being removably secured together between a rearward bolt and a forward bolt to pivotally support a steering shaft, wherein said steering head pipe comprises an upper bearing portion and a lower bearing portion, said upper bearing portion extending upwardly from an upper portion of each of said left and right main frames, said upper bearing portion comprising a forward portion and a rearward portion, said forward portion and said rearward portion having substantially equal widths, a forward bolt and a rearward bolt extending through said upper bearing portion and having substantially equal lengths, said lower bearing portion comprising a forward portion and a rearward portion, said forward portion being wider than said rearward portion, a rearward bolt and a forward bolt extending through said lower bearing portion and said rearward bolt being longer than said forward bolt.

2. The motorcycle of claim 1, wherein said steering head pipe comprises an intermediate fastening portion between said upper bearing portion and said lower bearing portion and said intermediate fastening portion comprises a rearward portion that is wider than a forward portion, a rearward fastener and a forward fastener extending through said intermediate fastening portion and said rearward fastener being longer than said forward fastener.

3. The motorcycle of claim 1, wherein said steering shaft is pivotally supported by said steering head pipe.

4. The motorcycle of claim 3, wherein said rearward bolt has a length that is longer than an outer diameter of the steering shaft.

5. The motorcycle of claim 1, wherein said rearward bolt has a length that is longer than an outer diameter of the steering shaft.

6. A motorcycle comprising a frame assembly, said frame assembly comprising a left main frame and a right main frame, an engine mounting bracket being integrally formed on each of said left and right main frames, an engine being directly connected to said left and right main frames by said engine mounting brackets, said left and right main frames each comprising a portion of a steering head pipe, each of said left and right main frames extending rearward and downward from said portion of said steering head pipe, a left rear arm bracket extending downward from a left main frame and a right rear arm bracket extending downward from said right main frame, said steering head pipe being split into a left portion and a right portion such that said left main frame integrally comprises said left portion of said steering head pipe and said left rear arm bracket and said right main frame integrally comprises said right portion of said steering head pipe and said right rear arm bracket, said left and right portions of said steering head pipe being removably secured together between a rearward bolt and a forward bolt to pivotally support a steering shaft, wherein said steering head pipe comprises an upper bearing portion, a lower bearing portion and an intermediate fastening portion between said upper bearing portion and said lower bearing portion and said intermediate fastening portion comprises a rearward portion that is wider than a forward portion, a rearward fastener and a forward fastener extending through said intermediate fastening portion and said rearward fastener being longer than said forward fastener.

7. The motorcycle of claim 6, wherein said steering shaft is pivotally supported by said steering head pipe.

8. The motorcycle of claim 7, wherein said rearward bolt has a length that is longer than an outer diameter of the steering shaft.

9. The motorcycle of claim 6, wherein said rearward bolt has a length that is longer than an outer diameter of the steering shaft.

10. A motorcycle comprising a frame assembly, said frame assembly comprising a left main frame and a right main frame, said left and right main frames each comprising a portion of a steering head pipe, each of said left and right main frames extending rearward and downward from said portion of said steering head pipe, a left rear arm bracket extending downward from a left main frame and a right rear arm bracket extending downward from said right main frame, said steering head pipe being split into a left portion and a right portion such that said left main frame integrally comprises said left portion of said steering head pipe and said left rear arm bracket and said right main frame integrally comprises said right portion of said steering head pipe and said right rear arm bracket, said left and right portions of said steering head pipe being removably secured together between a rearward bolt and a forward bolt to pivotally support a steering shaft, and an engine being directly connected to said left and right main frames, wherein said steering head pipe comprises an upper bearing portion, a lower bearing portion and an intermediate fastening portion between said upper bearing portion and said lower bearing portion and said intermediate fastening portion comprises a rearward portion that is wider than a forward portion, a rearward fastener and a forward fastener extending through said intermediate fastening portion and said rearward fastener being longer than said forward fastener.

11. The motorcycle of claim 10, wherein said steering shaft is pivotally supported by said steering head pipe.

12. The motorcycle of claim 11, wherein said rearward bolt has a length that is longer than an outer diameter of the steering shaft.

13. The motorcycle of claim 10, wherein said rearward bolt has a length that is longer than an outer diameter of the steering shaft.

14. A motorcycle comprising a frame assembly, said frame assembly comprising a left main frame and a right main frame, said left and right main frames each comprising a portion of a steering head pipe, each of said left and right main frames extending rearward and downward from said portion of said steering head pipe, a left rear arm bracket extending downward from a left main frame and a right rear arm bracket extending downward from said right main frame, said steering head pipe being split into a left portion and a right portion such that said left main frame integrally comprises said left portion of said steering head pipe and said left rear arm bracket and said right main frame integrally comprises said right portion of said steering head pipe and said right rear arm bracket, said left and right portions of said steering head pipe being removably secured together between a rearward bolt and a forward bolt to pivotally support a steering shaft, and an engine being directly connected to said left and right main frames, wherein said steering head pipe comprises an upper bearing portion and a lower bearing portion, said upper bearing portion extending upwardly from an upper portion of each of said left and right main frames, said upper bearing portion comprising a forward portion and a rearward portion, said forward portion and said rearward portion having substantially equal widths, a forward bolt and a rearward bolt extending through said upper bearing portion and having substantially equal lengths, said lower bearing portion comprising a forward portion and a rearward portion, said forward portion being wider than said rearward portion, a rearward bolt and a forward bolt extending through said lower bearing portion and said rearward bolt being longer than said forward bolt.

15. The motorcycle of claim 14, wherein said steering head pipe comprises an intermediate fastening portion between said upper bearing portion and said lower bearing portion and said intermediate fastening portion comprises a rearward portion that is wider than a forward portion, a rearward fastener and a forward fastener extending through said intermediate fastening portion and said rearward fastener being longer than said forward fastener.

16. The motorcycle of claim 14, wherein said steering shaft is pivotally supported by said steering head pipe.

17. The motorcycle of claim 16, wherein said rearward bolt has a length that is longer than an outer diameter of the steering shaft.

18. The motorcycle of claim 14, wherein said rearward bolt has a length that is longer than an outer diameter of the steering shaft.

19. A motorcycle comprising a body frame, said body frame comprising a left main frame and a right main frame, said left and right main frames being separable at a steering head pipe and extending rearwardly and downwardly from said steering head pipe, a left rear arm bracket and a right rear arm bracket extending downwardly from corresponding rear ends of said left and right main frames, said steering head pipe being split into a left steering head pipe portion and a right steering head pipe portion, said left and right steering head pipe portions being removably secured together between a rearward bolt and a forward bolt and said left and right steering head pipe portions together pivotally supporting a steering shaft, a left split frame being defined by said left steering head pipe portion, said left main frame and said left rear arm bracket combined into a single integrated component, a right split frame being defined by said right steering head pipe portion, said right main frame and said right rear arm bracket combined into a single integrated component, a left engine mounting bracket and a right engine mounting bracket being positioned between said left and right main frames, said left engine mounting bracket being integrally formed with said left split frame and said right engine mounting bracket being integrally formed with said right split frame, an engine being coupled to said left and right engine mounting brackets, seat rail mounting brackets that support seat rails being formed on rearward portions of the main frames, said left and right engine mounting brackets being formed proximate an intersection of said seat rail mounting brackets and said main frames, said seat rail mounting brackets comprising a plate shape, a proximal portion of each of said seat rail mounting brackets being connected to said main frame, a dimension being defined along said intersection of said seat rail mounting brackets and said main frames, a support portion of said seat rail mounting brackets extending from each of said proximal portions of said seat rail mounting brackets, said support portions supporting said seat rails, and said engine mounting brackets being disposed within a portion of each said split frames defined within said dimension of said intersection.

20. The motorcycle of claim 19, wherein each of said split frames comprises a bent region defined between said main frames and said rear arm brackets and said engine mounting brackets are positioned along said bent region.

21. The motorcycle of claim 19, wherein said steering shaft is pivotally supported by said steering head pipe.

22. The motorcycle of claim 21, wherein said rearward bolt has a length that is longer than an outer diameter of the steering shaft.

23. The motorcycle of claim 19, wherein said rearward bolt has a length that is longer than an outer diameter of the steering shaft.

24. A motorcycle comprising a body frame, said body frame comprising a left main frame and a right main frame, said left and right main frames being separable at a steering head pipe and extending rearwardly and downwardly from said steering head pipe, a left rear arm bracket and a right rear arm bracket extending downwardly from corresponding rear ends of said left and right main frames, said steering head pipe being split into a left steering head pipe portion and a right steering head pipe portion, said left and right steering head pipe portions being removably secured together between a rearward bolt and a forward bolt and said left and right steering head pipe portions together pivotally supporting a steering shaft, a left split frame being defined by said left steering head pipe portion, said left main frame and said left rear arm bracket combined into a single integrated component, a right split frame being defined by said right steering head pipe portion, said right main frame and said right rear arm bracket combined into a single integrated component, a left engine mounting bracket and a right engine mounting bracket being positioned between said left and right main frames, said left engine mounting bracket being integrally formed with said left split frame and said right engine mounting bracket being integrally formed with said right split frame, an engine being coupled to said left and right engine mounting brackets, wherein said engine mounting brackets comprise contact portions that abut with engine mounting support portions of said engine, said engine mounting brackets also comprising cylindrical portions into which head insertion hole portions and shaft insertion hole portions are positioned, seating surfaces being defined at a transition between said head insertion hole portions and said shaft insertion hole portions, said cylindrical portions having approximately concentric shapes with respect to said head insertion hole portions.

25. The motorcycle of claim 24, wherein said steering shaft is pivotally supported by said steering head pipe.

26. The motorcycle of claim 25, wherein said rearward bolt has a length that is longer than an outer diameter of the steering shaft.

27. The motorcycle of claim 24, wherein each of said split frames comprises a bent region defined between said main frames and said rear arm brackets and said engine mounting brackets are positioned along said bent region.

28. The motorcycle of claim 24, wherein said rearward bolt has a length that is longer than an outer diameter of the steering shaft.

29. A motorcycle comprising a body frame, said body frame comprising a left main frame and a right main frame, said left and right main frames being separable at a steering head pipe and extending rearwardly and downwardly from said steering head pipe, a left rear arm bracket and a right rear arm bracket extending downwardly from corresponding rear ends of said left and right main frames, said steering head pipe being split into a left steering head pipe portion and a right steering head pipe portion, said left and right steering head pipe portions being removably secured together between a rearward bolt and a forward bolt and said left and right steering head pipe portions together pivotally supporting a steering shaft, a left split frame being defined by said left steering head pipe portion, said left main frame and said left rear arm bracket combined into a single integrated component, a right split frame being defined by said right steering head pipe portion, said right main frame and said right rear arm bracket combined into a single integrated component, a left engine mounting bracket and a right engine mounting bracket being positioned between said left and right main frames, said left engine mounting bracket being integrally formed with said left split frame and said right engine mounting bracket being integrally formed with said right split frame, an engine being coupled to said left and right engine mounting brackets, wherein said left and right steering head pipe portions each an upper bearing portion and a lower bearing portion, said upper bearing portions projecting upwardly from an upper adjacent portion of said left and right main frames, and said upper bearing portions having a forward portion and a rearward portion that have approximately equal widths such that a forward bolt and a rearward bolt are generally equal in length, said lower bearing portions having a rearward portion and a forward portion, said rearward portion having a greater width than said forward portion and a rearward bolt that extends through said lower bearing portions being longer than a forward bolt that extends through said lower bearing portions.

30. The motorcycle of claim 29, wherein said steering shaft is pivotally supported by said steering head pipe.

31. The motorcycle of claim 30, wherein said rearward bolt has a length that is longer than an outer diameter of the steering shaft.

32. The motorcycle of claim 29, wherein each of said split frames comprises a bent region defined between said main frames and said rear arm brackets and said engine mounting brackets are positioned along said bent region.

33. The motorcycle of claim 29, wherein said rearward bolt has a length that is longer than an outer diameter of the steering shaft.

34. A motorcycle comprising a body frame, said body frame comprising a left main frame and a right main frame, said left and right main frames being separable at a steering head pipe and extending rearwardly and downwardly from said steering head pipe, a left rear arm bracket and a right rear arm bracket extending downwardly from corresponding rear ends of said left and right main frames, said steering head pipe being split into a left steering head pipe portion and a right steering head pipe portion, said left and right steering head pipe portions being removably secured together between a rearward bolt and a forward bolt and said left and right steering head pipe portions together pivotally supporting a steering shaft, a left split frame being defined by said left steering head pipe portion, said left main frame and said left rear arm bracket combined into a single integrated component, a right split frame being defined by said right steering head pipe portion, said right main frame and said right rear arm bracket combined into a single integrated component, a left engine mounting bracket and a right engine mounting bracket being positioned between said left and right main frames, said left engine mounting bracket being integrally formed with said left split frame and said right engine mounting bracket being integrally formed with said right split frame, an engine being coupled to said left and right engine mounting brackets, wherein said left and right steering head pipe portions each comprise an upper bearing portion and a lower bearing portion, an intermediate fastening portion being provided between each said upper bearing portion and said lower bearing portion, said intermediate fastening portion comprising a rearward portion that is wider than a forward portion such that a rearward bolt that extends through said rearward portion is longer than a forward bolt that extends through said forward portion.

35. The motorcycle of claim 34, wherein said steering shaft is pivotally supported by said steering head pipe.

36. The motorcycle of claim 35, wherein said rearward bolt has a length that is longer than an outer diameter of the steering shaft.

37. The motorcycle of claim 34, wherein each of said split frames comprises a bent region defined between said main frames and said rear arm brackets and said engine mounting brackets are positioned along said bent region.

38. The motorcycle of claim 34, wherein said rearward bolt has a length that is longer than an outer diameter of the steering shaft.

* * * * *

UNITED STATES PATENT AND TRADEMARK OFFICE
CERTIFICATE OF CORRECTION

PATENT NO.        : 7,383,909 B2
APPLICATION NO.   : 11/181391
DATED             : June 10, 2008
INVENTOR(S)       : Masao Kawase

Page 1 of 1

It is certified that error appears in the above-identified patent and that said Letters Patent is hereby corrected as shown below:

Col. 2, Line 56, delete "fonning" and insert -- forming -- therefore.

Signed and Sealed this

Thirtieth Day of December, 2008

JON W. DUDAS
*Director of the United States Patent and Trademark Office*